United States Patent
Ramachandra Iyer et al.

(10) Patent No.: US 11,087,183 B2
(45) Date of Patent: Aug. 10, 2021

(54) METHOD AND SYSTEM OF MULTI-MODALITY CLASSIFICATION USING AUGMENTED DATA

(71) Applicant: Wipro Limited, Bangalore (IN)

(72) Inventors: Manjunath Ramachandra Iyer, Bangalore (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 176 days.

(21) Appl. No.: 16/540,255

(22) Filed: Aug. 14, 2019

(65) Prior Publication Data

US 2020/0410283 A1 Dec. 31, 2020

(30) Foreign Application Priority Data

Jun. 28, 2019 (IN) .............................. 201941025958

(51) Int. Cl.
*G06K 9/00* (2006.01)
*G06K 9/62* (2006.01)
(Continued)

(52) U.S. Cl.
CPC ............ *G06K 9/628* (2013.01); *G06F 40/205* (2020.01); *G06K 9/46* (2013.01); *G06K 9/6201* (2013.01);
(Continued)

(58) Field of Classification Search
CPC ........ G06K 9/628; G06K 9/6201; G06K 9/46; G06K 9/6256; G06K 9/6262;
(Continued)

(56) References Cited

U.S. PATENT DOCUMENTS 9,324,022 B2 4/2016 Williams, Jr. et al.
2015/0254555 A1* 9/2015 Williams, Jr. ....... G06N 3/0454
706/14

(Continued)

FOREIGN PATENT DOCUMENTS

WO 2018140913 A1 8/2018

OTHER PUBLICATIONS

Bach, Sebastian, et al. "On pixel-wise explanations for non-linear classifier decisions by layer-wise relevance propagation." PloS one 10.7 (2015): e0130140. (Year: 2015).*

(Continued)

*Primary Examiner* — Andrew M Moyer
(74) *Attorney, Agent, or Firm* — Finnegan, Henderson, Farabow, Garrett & Dunner, LLP

(57) ABSTRACT

A method and system of multi-modality classification using augmented data is disclosed. The method includes generating a pattern for each of a plurality of augmented data associated with each of a plurality of object classes, based on at least one modality associated with each of the plurality of objects classes using a Long Term Short Memory (LSTM) classifier and a Layer-wise Relevance Propagation (LRP). The method further includes classifying an input image into a first object class of the plurality of object classes based on one or more objects within the input image using a Convolution Neural Network (CNN). The method further includes re-classifying the input image into one of the first object class or a second object class of the plurality of object classes when the accuracy of classification by the CNN into the first object class is below a matching threshold.

19 Claims, 8 Drawing Sheets

(51) Int. Cl.
 *G06K 9/46* (2006.01)
 *G06F 40/205* (2020.01)
(52) U.S. Cl.
 CPC ......... *G06K 9/6256* (2013.01); *G06K 9/6262* (2013.01)
(58) Field of Classification Search
 CPC .. G06K 9/6271; G06K 9/4628; G06F 40/205; G06F 40/289; G06F 40/30
 USPC .................................................. 382/155–161
 See application file for complete search history.

(56) References Cited

U.S. PATENT DOCUMENTS

| | | | |
|---|---|---|---|
| 2017/0098162 A1 | 4/2017 | Ellenbogen et al. | |
| 2017/0200092 A1* | 7/2017 | Kisilev | G06K 9/4628 |
| 2018/0018553 A1* | 1/2018 | Bach | G06K 9/4628 |
| 2018/0218176 A1 | 8/2018 | Voorhees et al. | |
| 2020/0042833 A1* | 2/2020 | Toor | G06K 9/6267 |
| 2020/0074211 A1* | 3/2020 | Georgis | G06K 9/3258 |

OTHER PUBLICATIONS

Binder, Alexander, et al. "Layer-wise Relevance Propagation for Neural Networks with Local Renormalization Layers." (Year: 2016).*

Xu, Huazhe, et al. "End-to-End Learning of Driving Models from Large-Scale Video Datasets." 2017 IEEE Conference on Computer Vision and Pattern Recognition (CVPR). IEEE, 2017. (Year: 2017).*

Raj, B.. "Data Augmentation: How to use Deep Learning when you have Limited Data—Part 2", .https://medium.com/nanonets/how-to-use-deep-learning-when-you-have-limited-data-part-2-data-augmentation-c26971dc8ced, 2019, pp. 1-16.

* cited by examiner

| Modalities 402 | Object Class 404 | Augmented Data 406 | Augmented Data 408 |
|---|---|---|---|
| Object 1 | Class 1 | Feature 1 | Sub-Feature 1 |
| Object 2 | Class 2 | Feature 2 | Sub-Feature 2 |

METHOD AND SYSTEM OF MULTI-MODALITY CLASSIFICATION USING AUGMENTED DATA

TECHNICAL FIELD

This disclosure relates generally to neural networks, and more particularly to system and method of multi-modality classification using augmented data.

BACKGROUND

One of the issues in a deep learning classifier may be an accuracy in decision-making. The deep learning classifiers may require training data to learn and an accuracy of a deep learning classifier may be inextricably dependent upon the quality of the training data used to train the classifier. Hence, due to absence of additional information relating to one or more modalities to be classified in the training data, the deep learning classifier may inaccurately classify one or more objects.

In some conventional methods, for identifying one or more objects by the deep learning classifier, the training data may include an object information. However, such object information may become inadequate to precisely classify the object. Also, such conventional methods may not facilitate additional information including certain specific description and explanation of objects which may further be used by the classifier to accurately classify one or more modalities which may include object, images, sound, touch, or the like.

In other conventional methods, a multi-modal classifier may be adapted to classify one or more modalities. However, such conventional methods fail to blend disjoint content of a video with an audio or text of the object taken at some other time slot, in order to make use of additional information associated with the object for classification. In other words, in such conventional methods, deep learning classifier may lack in any mechanism in which the classifier may identify augmented information to make precise classifications.

SUMMARY

In one embodiment, a method of multi-modality classification using augmented data is disclosed. In one embodiment, the method may include generating a pattern for each of a plurality of augmented data associated with each of a plurality of object classes, based on at least one modality associated with each of the plurality of objects classes using a Long Term Short Memory (LSTM) classifier and a Layer-wise Relevance Propagation (LRP). The plurality of augmented data for each of the plurality of object classes comprises at least one feature. The method may further include classifying an input image into a first object class of the plurality of object classes based on one or more objects within the input image using a Convolution Neural Network (CNN). The method may further include re-classifying the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold.

In another embodiment, a system for multi-modality classification using augmented data is disclosed. The system includes a processor and a memory communicatively coupled to the processor, wherein the memory stores processor instructions, which, on execution, causes the processor to generate a pattern for each of a plurality of augmented data associated with each of a plurality of object classes, based on at least one modality associated with each of the plurality of objects classes using a LSTM classifier and a LRP. The plurality of augmented data for each of the plurality of object classes comprises at least one feature. The processor instructions further cause the processor to classify an input image into a first object class of the plurality of object classes based on one or more objects within the input image using a CNN. The processor instructions cause the processor to re-classify the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold.

In yet another embodiment, a non-transitory computer-readable storage medium is disclosed. The non-transitory computer-readable storage medium has instructions stored thereon, a set of computer-executable instructions causing a computer comprising one or more processors to perform steps comprising generating a pattern for each of a plurality of augmented data associated with each of a plurality of object classes, based on at least one modality associated with each of the plurality of objects classes using a LSTM classifier and a LRP; classifying an input image into a first object class of the plurality of object classes based on one or more objects within the input image using a CNN; and re-classifying the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold. It should be noted that the plurality of augmented data for each of the plurality of object classes comprises at least one feature.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
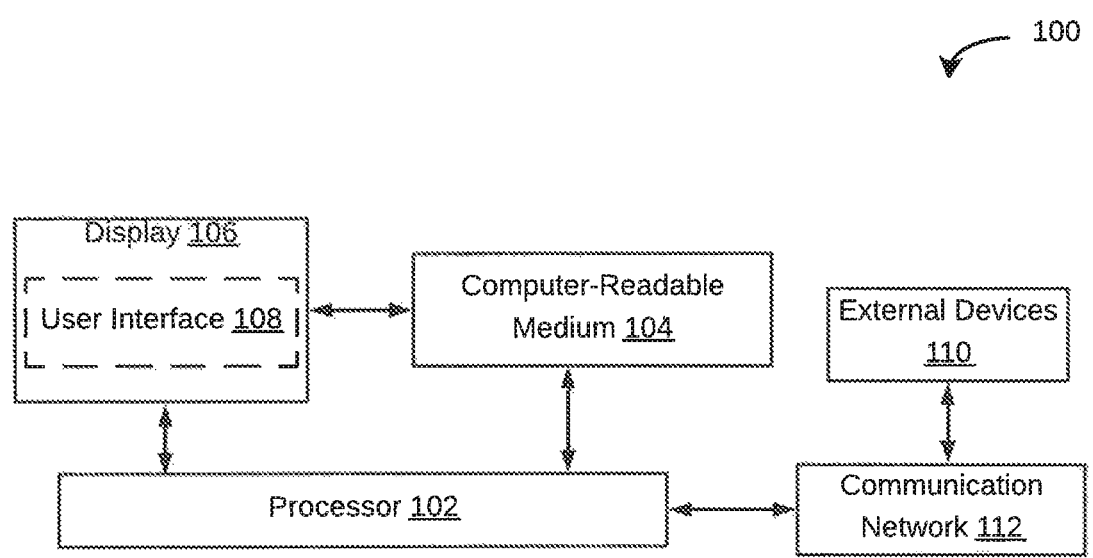
FIG. 1 is a block diagram of a system for multi-modality classification using augmented data, in accordance with an embodiment.

Referring now to FIG. 1, a block diagram of a system 100 for multi-modality classification using augmented data is illustrated, in accordance with an embodiment. As will be appreciated, the system 100 may be implemented in a classification device (not shown in FIG. 1). The classification device may be further embedded in a server, a desktop, a laptop, a notebook, a netbook, a tablet, a smartphone, a mobile phone, or any other computing device.

As will be described in greater detail in conjunction with FIG. 2 to FIG. 7, the classification device may generate a pattern for each of a plurality of augmented data associated with each of a plurality of object classes, based on at least one modality associated with each of the plurality of objects classes using a Long Terra Short Memory (LSTM) classifier and a Layer-wise Relevance Propagation (LRP). The plurality of augmented data for each of the plurality of object classes includes at least one feature. Further, the classification device may classify an input image into a first object class of the plurality of object classes based on one or more objects within the input image using a Convolution Neural Network (CNN). Further, the classification device may re-classify the input image into one of the first object class or a second object class of the plurality of object classes based on matching of patterns associated with the input image with the pattern associated with each of the at least one augmented data using the LSTM classifier, when the accuracy of classification by the CNN into the first object class may be below a matching threshold.

The system 100 may include a processor 102, a computer-readable storage medium 104 (for example, a memory), and a display 106. The computer-readable storage medium 104 may store instructions that, when executed by the processor 102, may cause the processor 102 to perform multi-modality classification using augmented data. The computer-readable storage medium 104 may also store various data (for example, pattern, plurality of augmented data, plurality of object classes, at least one feature, input image, matching threshold, training data, metadata, class table, and the like) that may be captured, processed, and/or required by the system 100. The system 100 may interact with a user via a user interface 108 accessible via the display 106. The system 100 may also interact with one or more of external devices 110 over a communication network 112 for sending or receiving various data. The external devices 110 may include, but may not be limited to a remote server, a digital device, or another computing system. The system 100 may also be adapted to exchange data with other components or service providers using the communication network 112, for example, Wide Area Network (WAN) or the Internet.

Figure 2:
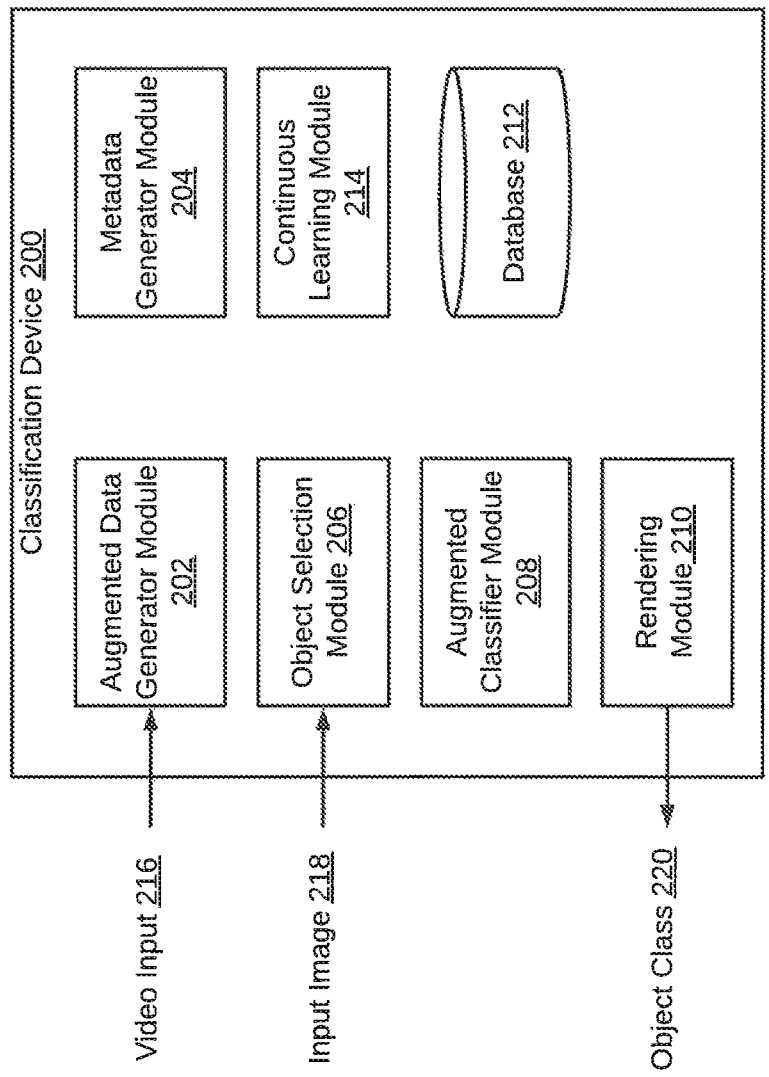
FIG. 2 illustrates a functional block diagram of a classification device configured to perform multi-modality classification using augmented data, in accordance with an embodiment.

Referring now to FIG. 2, a functional block diagram of a classification device 200 configured to perform multi-modality classification using augmented data is illustrated, in accordance with an embodiment. The classification device 200 may implement the system 100. The classification device 200 may include an augmented data generator module 202, a metadata generator module 204, an object selection module 206, an augmented classifier module 208, a rendering module 210, a database 212, and a continuous learning module 214. As will be appreciated by those skilled in the art, all such aforementioned modules 202-214 may be represented as a single module or a combination of different modules. Moreover, as will be appreciated by those skilled in the art, each of the modules 202-214 may reside, in whole or in parts, on one device or multiple devices in communication with each other. By way of an example, one or more of the modules 202-214 may be located on a client device (not shown in FIG. 2), while remaining modules may be located on a server (not shown in FIG. 2).

The augmented data generator module 202 may receive a video input 216, which may provide a training data to a Convolutional Neural Network (CNN). The video input 216 may be ingested into the classification device 200 to generate a plurality of augmented data. The video input 216 may include a training data and based on the training data, the augmented data generator module 202 may generate a plurality of object classes. The video input 216, for example, may be a combination of a plurality of images. Further, the augmented data generator module 202 may segregate one or more objects present in the training data. Based on the one or more objects, the augmented data generator module 202 may generate the plurality of augmented data. The augmented data generator module 202 may additionally generate at least one feature for each of the plurality of object classes. The augmented data generator module 202 may also maintain a class table for each of the plurality of object classes, such that, the class table includes the plurality of augmented data and corresponding features. The augmented data generator module 202 may store the training data associated with the video input 216 and the class table in the database 212.

Further, training of the CNN may be performed for each of the plurality of object classes, based on at least one object from one or more objects associated with a specific object class. To this end, for a given object associated with an object class, remaining objects of the one or more objects may be considered as information that is in proximity to the given object. This proximity information may be the plurality of augmented data associated with the object in the object class. By way of an example, for classification of a first object and a second object, the first object may be subject of interest and one or more objects including the second object in proximity to the first object may form augmented data for the first object.

Once the augmented data generator module 202 has stored the class table and the video input 216 in the database 212, the metadata generator module 204 may retrieve one or more images from the database 212 and may subsequently generate metadata for a plurality of objects in the one or more images based on at least one feature associated with each image as determined by the augmented data generator module 202. The metadata generated by the metadata generator module 204 may be a textual string that includes one or more objects and corresponding relation of the one or more objects with each of the plurality of object classes. The metadata generator module 204 may then store the metadata in the database 212. The database 212 may be such that it can be accessed fast in in real time by the augmented classifier module 208 in order to fetch metadata required for multi-modality based classification.

The object selection module 206 may be configured to receive an input image 218, which needs to be classified by the classification device 200. The input image 218 may be an image or a video with a predefined frame rate and size. In the classification device 200, the object selection module 206 may facilitate selection of at least one object from a plurality of objects within the input image 218, based on which the input image 218 may be classified. To this end, the object selection module 206 may also receive user input to aid selection of the at least one object from one or more objects in the input image 218. The object selection module 206 may send the at least one object selected from the input image 218 to the augmented classifier module 208.

In addition to the at least one object, the augmented classifier module 208 may retrieve the class table from the database 212 in order to access augmented data stored in the class table. When classification of an object into one or more of the plurality of object classes is such that, the degree of classification into the one or more object classes may be very close, or when at least one feature of the plurality of object classes may not be adequate to classify the input image 218 with good accuracy, the augmented classifier module 208 may classify the input image 218 into an object class 220 based on the plurality of augmented data extracted from the class table. The augmented classifier module 208 may share the information regarding the object class 220 identified for the input image 218 with the rendering module 210. The information regarding the object class may also include the plurality of augmented data used for classification of the input image 218.

The rendering module 210 may then provide the object class 220 to the user. The object class 220, for example, may be provided to the user on the display 106, by way of the user interface 108. The user may then provide feedback, via the user interface 108, to interactively amend the object class 220 or to select an object of interest from the input image 218.

Based on the feedback received from the user, the continuous learning module 214 may fine-tune the classification device 200 in order to improve precision of the classification device 200. The continuous learning module 214 may also store learning derived from the feedback in the database 212.

The modules within the classification device 200 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), Simple To Design (STD) Bus, Recommended Standard (RS)-232, RS-422, RS-485, I2C, Serial Peripheral Interface (SPI), Microwire, 1-Wire, IEEE 1284, Intel Quick Path Interconnect, InfiniBand, or Peripheral Component Interconnect Express (PCIe) etc.

Figure 3:
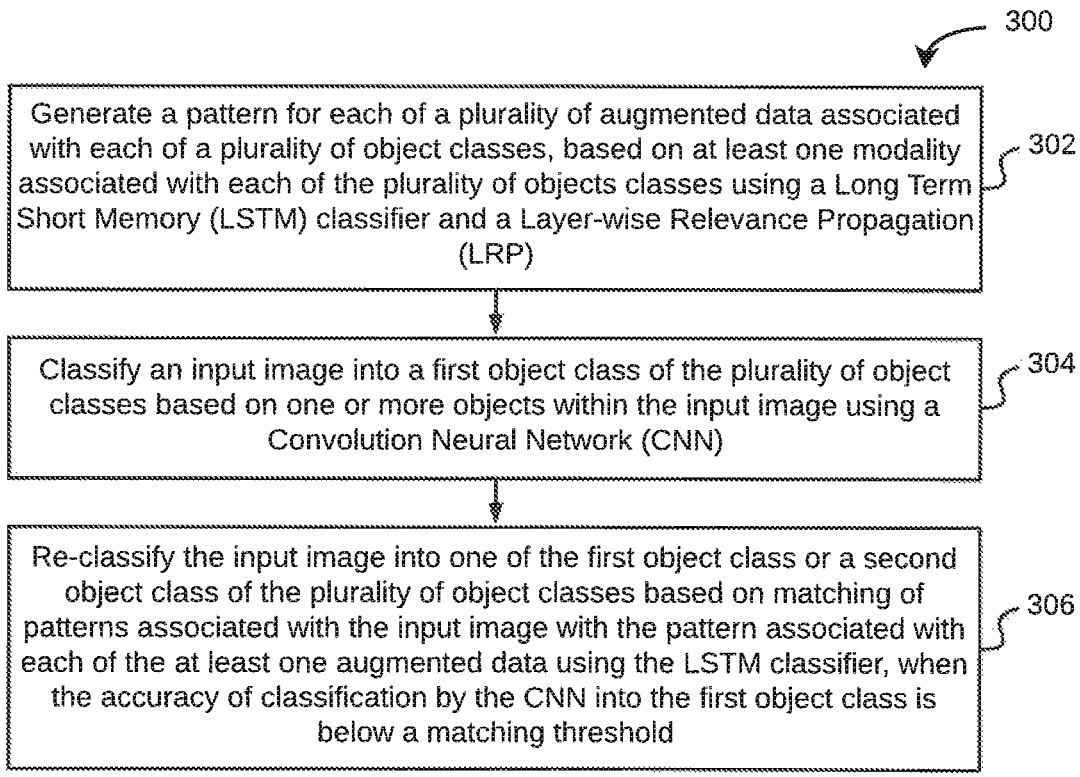
FIG. 3 illustrates a flowchart of a method for multi-modality classification using augmented data, in accordance with an embodiment.
Figure 4:
FIG. 4 illustrates an exemplary tabular diagram of a class table for storing the plurality of augmented data, in accordance with an embodiment.

Referring now to FIG. 3, a flowchart of a method for multi-modality classification using augmented data is illustrated, in accordance with an embodiment. The method 300 may be executed by the classification device 200.

At step 302, the classification device 200 may generate a pattern for each of a plurality of augmented data associated with each of a plurality of object classes, based on at least one modality associated with each of the plurality of objects classes. The pattern for each of the plurality of augmented data may be generated using a Long Term Short Memory (LSTM) classifier and a Layer-wise Relevance Propagation (LRP). In other words, for a given object class, patterns are generated for the augmented data created for the given object class based on the at least one modality associated with the given object class. The at least one modality, for example, which may include, but are not limited to object, image, audio, touch, smell, taste, or the like. In an embodiment, for each of the plurality of object classes, the plurality of augmented data may be generated by the user and may further be stored in the class table. After generating the pattern for each of the plurality of augmented data, the classification device 200 may store in the class table. In an exemplary embodiment, a class table 400 has been depicted in conjunction with FIG. 4. The class table 400 may include multiple columns, for example, a modality 402, an object class 404, an augmented data 406, and an augmented data 408. The column for the modality 402 may include an object, the column for the object class 402 may include an object class associated with the object, the column for the augmented data 406 may include a feature associated with the object, and the column for the augmented data 408 may include sub-features associated with the feature. By way of an example, a modality may be an audio recording of a fighter plane taking off, the object class may be a fighter plane, a feature may include intensity of the sound, and the sub-feature may include pitch and duration of the sound.

The classification device 200 may identify proportion of each of the plurality of object classes with respect to the training data based on a contribution of each neuron of the training data. The contribution of each neuron form previous layers may be computed proportionally using the LRP technique. The LRP technique may provide the relevance of one or more modality that may be concatenated and applied at input terminal as well as the contribution from parts of each modality.

The classification device 200 may receive the plurality of augmented data, for each of the plurality of object classes, from multiple sources. In an embodiment, an image classifier (for example, ImageNet) may be implemented in the CNN, which may generate the plurality of augmented data for each of the plurality of object classes. The plurality of augmented data may include an associated sound or image. In some cases, the plurality of augmented data may include associated habits. The plurality of augmented data may be identified based on captioning or description of the one or more images. This has been explained in detail in conjunction with FIGS. 6A and 6B.

At step 304, the classification device 200 may classify an input image into a first object class of the plurality of object classes based on one or more objects within the input image using the CNN. For classification of the input image into the first class object, the CNN may match the pattern of one or more objects within the input image with respect to the pattern of one or more objects of each of the plurality of object classes. Further, when the matching of the pattern of one or more objects within the input image with respect to the patterns associated with one or more objects of a first class from the plurality of object classes may be above a predefined threshold, the CNN may classify the input image into the first object class. To this end, a pattern associated with the input image is compared with sample feature patterns of best classified image of each of the plurality of object classes at input of softmax layer. These sample feature patterns may already be stored the class table (for example, the class table 400). In an embodiment, distance (or difference) of each such sample feature pattern is computed with respect to the pattern of the input image and an object class of the sample feature pattern, which has the smallest distance (or difference) when compared with the pattern of the input image, is used to classify the input image. The distance may be determined at the softmax out.

When the accuracy of classification by the CNN into the first object class is below the matching threshold, the classification device 200, at step 306, may re-classify the input image into one of the first object class or a second object class of the plurality of object classes. The re-classification by the classification device 200 is based on matching of patterns associated with the input image with the pattern associated with each of the plurality of augmented data using the LSTM classifier. In an embodiment, it may be determined that the accuracy of classification by the CNN is below the matching threshold, when distance computed for each sample feature pattern relative to the pattern for the input image is more than a first distance threshold. In this case, the classification device 200 may determine that features in the input image may be inadequate for classification. In another embodiment, it may be determined that the accuracy of classification by the CNN is below the matching threshold, when the difference between the smallest distance and the smallest but one distance computed for each sample feature pattern relative to the pattern for the input image is below a second distance threshold. In other words, when the smallest distance and the smallest but one distance have very similar values.

In an embodiment, to re-classify the input image, the classification device 200 matches the patterns associated with the input image with the patterns generated for each of the plurality of augmented data. Thereafter, based on the matching the classification device 200 determines a relevancy in descending order for each of the plurality of augmented data. Based on the determined relevancy for each of the plurality of augmented data, the classification device 200 then identifies the class for the input image. This is further explained in detail in conjunction with FIGS. 6A and 6B.

Figure 5:
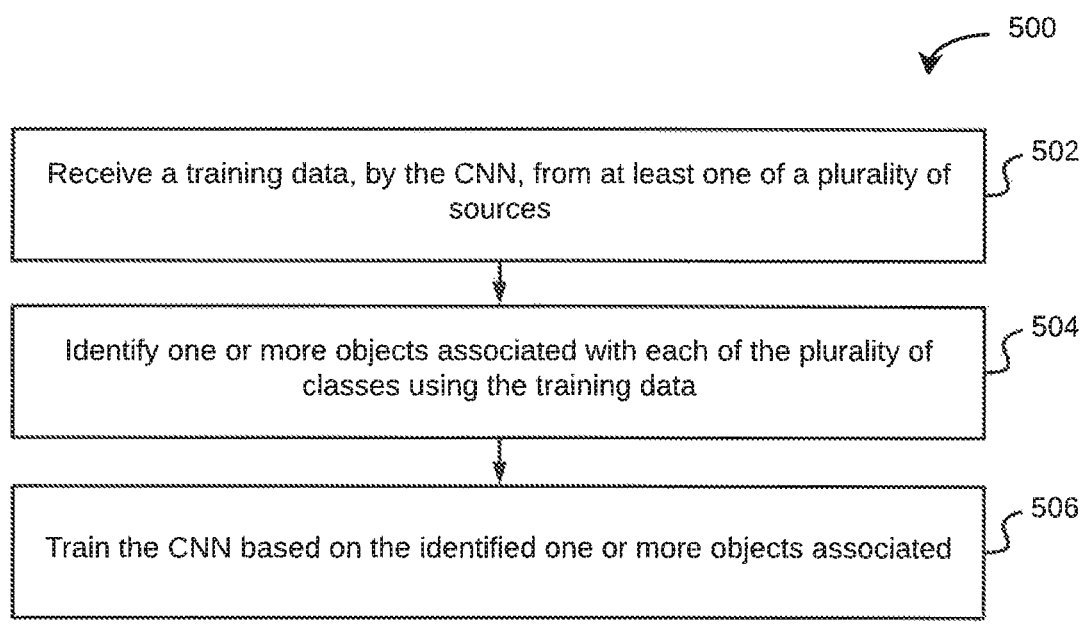
FIG. 5 illustrates a flowchart of a method for training of the Convolutional Neural Network (CNN) for multi-modality classification, in accordance with an embodiment.

Referring now to FIG. 5, a flowchart of a method 500 for training of the CNN to identify one or more object associated with a plurality of object classes is illustrated, in accordance with an embodiment. At step 502, the CNN may receive a training data from at least one of a plurality of sources. The plurality of sources may include internet, an external device, a user, or the like. The training data may include, but is not limited to one or more of image, video, sound, touch, or smell.

Based on the training data, the CNN may identify one or more objects associated with each of the plurality of object classes at step 504. In an embodiment, the user may identify one or more objects from the training data in order to train the CNN. When the CNN performs the identification of the one or more objects, the user may perform one or more of the following actions: agree to one or more objects selected for classification, overwrite with one or more new objects in the screen, or select more than one object for classification. The CNN may select one or more objects based on a plurality of parameters (for example, size), in which the user may also select one or more new object to classify the input image. Based on the identified one or more objects, at step 506, the CNN may be trained associated for classification of the input image.

Figure 6A:
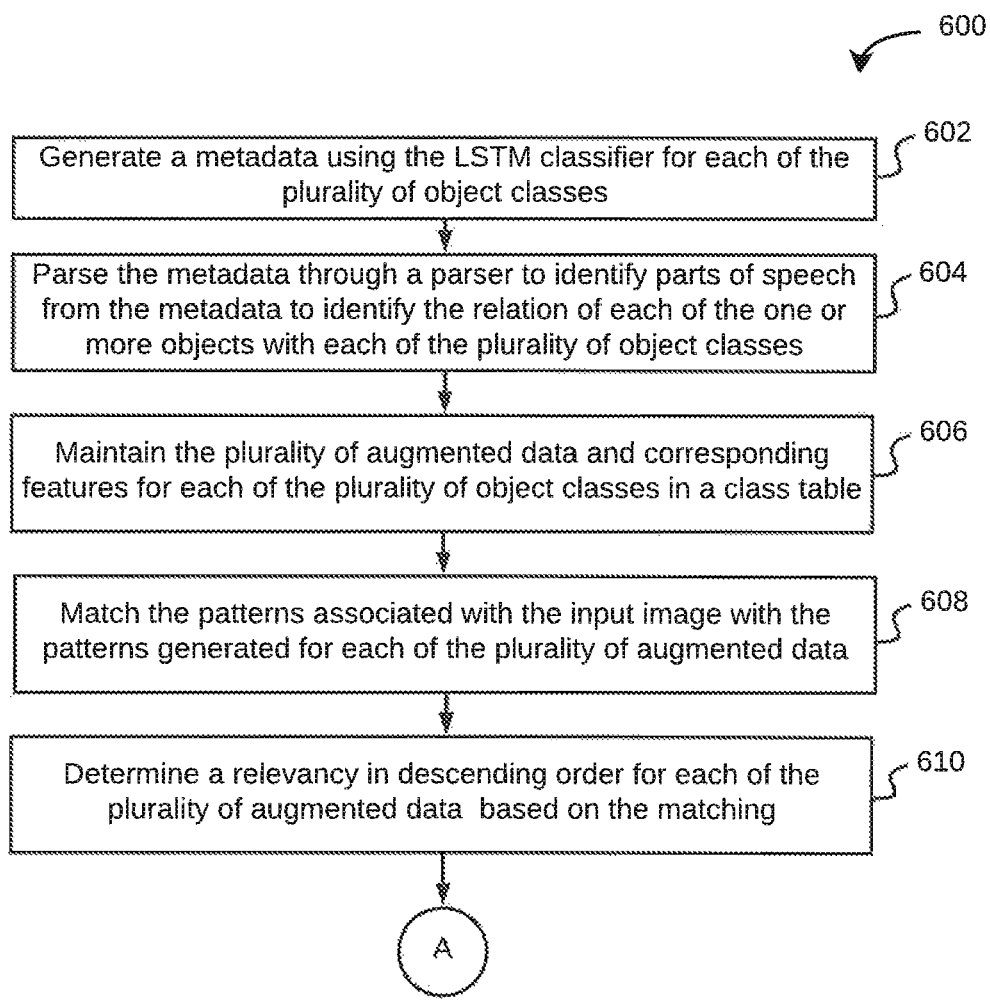
FIGS. 6A and 6B illustrates a detailed exemplary method for multi-modality classification using augmented data, in accordance with an embodiment.
Figure 6B:
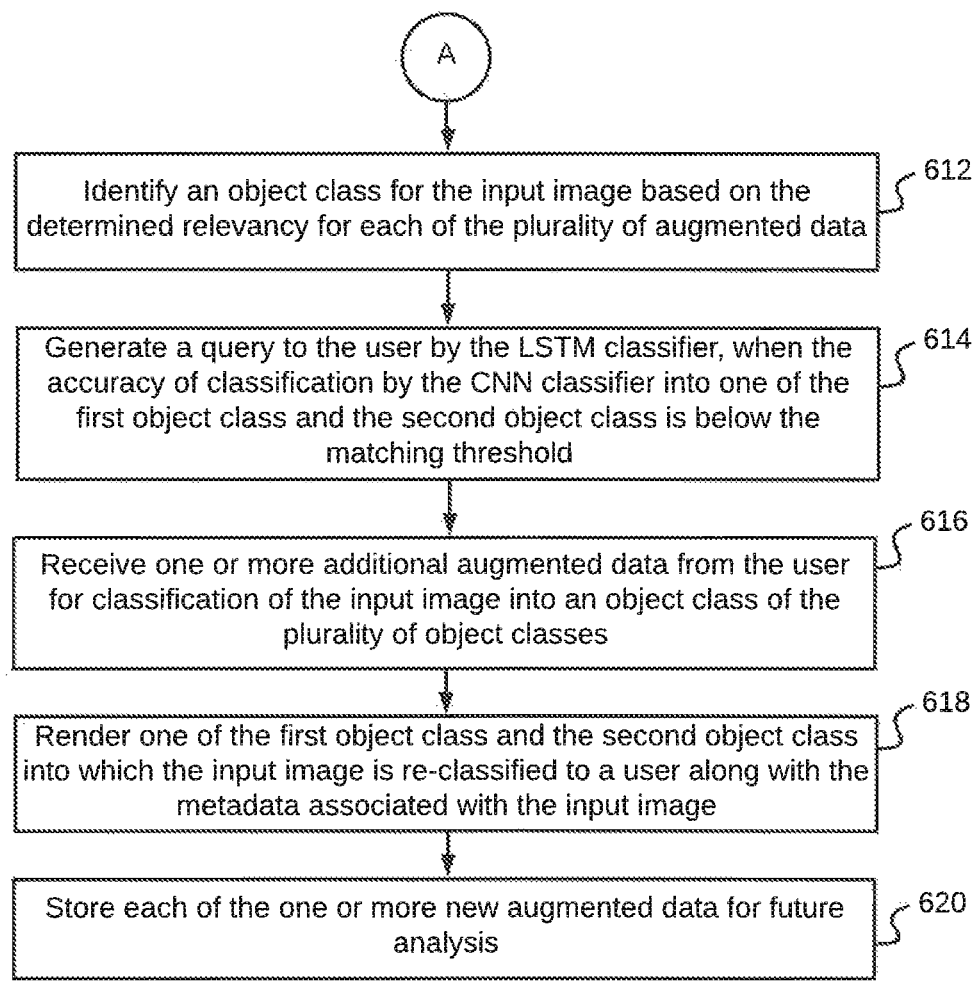

Referring now to FIGS. 6A and 6B, a detailed exemplary method 600 for multi-modality classification using augmented data is illustrated, in accordance with an embodiment. At step 602, the classification device 200 may generate a metadata using an LSTM classifier for each of the plurality of object classes. The metadata may be generated for one or more objects of the training data in one or more instances for each of the plurality of object classes. The metadata may be a textual string that includes one or more objects and corresponding relation of these one or more objects with each of the plurality of object classes. In other words, metadata generated by the LSTM classifier acts as augmented information for one or more object classes. In an embodiment, when an image input is received by the LSTM classifier, the input image is parsed to constituent objects before classification. Objects may be masked off one by one to get an object for a particular object class and other objects may acts as augmented data for the object.

By way of an example, the relation of a first object, which is associated with a first object class, with one or more objects in the training image may be stored as augmented data. To this end, the CNN, within the classification device 200, may be fed with training data (images) for each of the plurality of object classes. The output of the penultimate layer of the CNN may be fed as an input to an LSTM classifier, which is trained with a description of one or more objects of the training image. It should be noted that the description of one or more objects may include relation of one or more object with respect to corresponding object classes. Hence, for each input image, the LSTM classifier may generate a textual string, which may include relation of one or more objects in input image with respect to corresponding object classes.

At step 604, the classification device 200 may parse the metadata through a parser to identify parts of speech from the metadata to identify the relation of each of the one or more objects with each of the plurality of object classes. The metadata associated with one or more objects of the training data may be passed through the parser before classification of the input image. In an embodiment, the metadata or the textual string may be parsed through the parser to identify parts of speech (for example, verb, preposition, noun, or the like) within the textual string. It should be noted that the parsing action may be trained with the LSTM classifier in additional layers. Further, the classification device 200 may run a captioning algorithm over the training data to extract a relevant action. The LSTM classifier may note images of an object class that includes the same secondary objects.

In an embodiment, tracing may start from an output of the LSTM classifier. To get relevant proportion of an object class (i.e., softmax output in the outer layer of the LSTM classifier), contribution of neurons form previous layers is computed proportionally through Layerwise Relevance Propagation (LRP) technique and continued back until the input of the LSTM classifier is reached. This enables identification of the relevance of different modality inputs that is concatenated and applied at input terminal as well as the contribution from parts of each modality.

At step 606, the classification device 200 may maintain the plurality of augmented data and corresponding features for each of the plurality of object classes in a class table (for example, the class table 400). The classification device 200 may run a captioning algorithm over the training data to extract the plurality of augmented data.

Further, at step 608, the classification device 200 may match the patterns associated with the input image with the patterns generated for each of the plurality of augmented data. When the classification device 200 may not find adequate features in the input image then the classification device 200 may not classify the input image into the first object class of the plurality of object classes. The pattern of the plurality of augmented data, for each of the plurality of object classes, at input of soft max layer may be stored and matching of the pattern associated with the input image with respect to the pattern of the augmented data may be computed.

Further, at step 610, the classification device 200 may determine a relevancy in descending order for each of the plurality of augmented data based on the matching. The plurality of augmented data may be ingested to the classification device 200 for better classification. In an embodiment, when lesser number of feature may be available in one or more augmented data of the first object class, then one or more augmented data of next highest matching class may also be considered for classification. At step 612, the classification device 200 may identify an object class for the input image based on the determined relevancy for each of the plurality of augmented data. The object class for the input image may either be the first object class (which was also identified by the CNN) or a second object class, which is different from the first class.

However, when the accuracy of classification by the LSTM classifier into one of the first object class and the second object class is below the matching threshold, the classification device 200, via the LSTM classifier, may generate a query to the user at step 614. In an embodiment, the query may be raised to the user to get one or more additional augmented data, when the classification device 200 may not classify the input image based on the plurality of augmented data stored in the class table (for example, the class table 400). When the modality of classification may be an image then one or more additional augmented data may be readily available, but when the modality of classification may be other than image (for example, smell, touch, or the like), then the classification device 200 may need to raise query to the user. The plurality of augmented data may be checked based on an importance to the plurality of object classes. The importance, in an embodiment, may be evaluated based on a heat map of the plurality of object classes using Layer-wise Relevance Propagation (LRP) technique.

At step 616, the classification device 200 may receive one or more additional augmented data from the user for classification of the input image into an object class of the plurality of object classes. By way of an example, when the classification device 200 may raise the query to request for additional augmented data, a user may point a camera to one or more objects and may capture corresponding modality which may include, but are not limited to sound, taste, or the like. Hence, the user may visualize one or more objects of the training image, once the user may focus on the camera. The user may further extract additional objects and additional augmented data to classify the input image more precisely. The additional objects and the additional augmented data may be fed to the classification device 200 by the user. It should be noted that the user may extract the additional objects and the additional augmented data through a User Interface (UI).

Further, at step 618, the classification device 200 may render one of the first object class and the second object class into which the input image may be re-classified to the user along with the metadata associated with the input image. The classification device 200 may render the classification of the input image, which may include one or more modality classification. It should be noted that one or more objects of the multiple modality may be blended. Hence, the user may visualize the classification of the input image as well as the augmented data based on which the input image may be classified. Moreover, the user may visualize the metadata, which may be the textual string, from the LSTM.

Further, at step 620, the classification device 200 may store each of the one or more new augmented data for future analysis. The class table 400 may be configured to store one or more multi-modality result. The multi-modalities result may include result of classification, the additional objects, and the additional augmented data that may be adapted for classification of the input image by the classification device 200.

Hence, when the user may focus the camera on the training data and extract the additional objects and the additional augmented data then it may get added to the class table 400. It should be noted that the additional objects and the additional augmented data may be extracted by the user from multiple modalities. Also, the additional objects in the training data along with the classified object in the training data may be segregated before storing as the additional augmented data.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
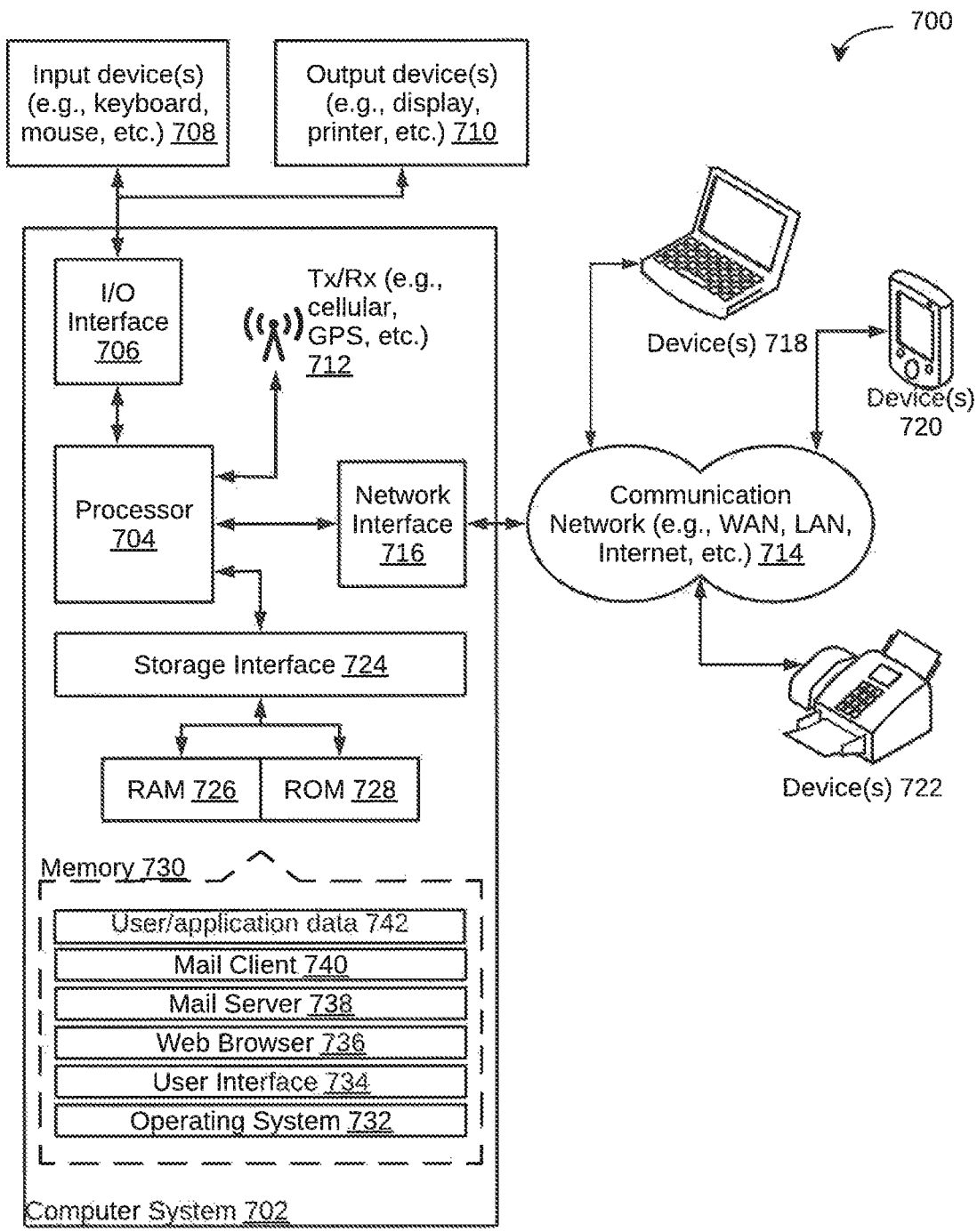
FIG. 7 is a block diagram of an exemplary computer system for implementing embodiments.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704, The processor 704 may include at least one data processor for executing program components for executing user or system-generated requests. A user may include a person, a person using a device such as those included in this disclosure, or such a device itself. The processor 704 may include specialized processing units such as integrated system (bus) controllers, memory management control units, floating point units, graphics processing units, digital signal processing units, etc. The processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON processor, CELERON® processor or other line of processors, etc. The processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 704 may be disposed in communication with one or more input/output (I/O) devices via an I/O interface 706. The I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 706, the computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with the processor 704. The transceiver 712 may facilitate various types of wireless transmission or reception. For example, the transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, the processor 704 may be disposed in communication with a communication network 716 via a network interface 714. The network interface 716 may communicate with the communication network 716. The network interface 714 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. The communication network 716 may include, without limitation, a direct interconnection, local area network (LAN), wide area network (WAN), wireless network (for example, using Wireless Application Protocol), the Internet, etc. Using the network interface 714 and the communication network 716, the computer system 702 may communicate with devices 718, 720, and 722. These devices 718, 720, and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 702 may itself embody one or more of these devices 718, 720, and 722.

In some embodiments, the processor 704 may be disposed in communication with one or more memory devices (for example, RAM 726, ROM 728, etc.) via a storage interface 724. The storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 730 may store a collection of program or database components, including, without limitation, an operating system 732, user interface application 734, web browser 736, mail server 738, mail client 740, user/application data 742 (for example, any data variables or data records discussed in this disclosure), etc. The operating system 732 may facilitate resource management and operation of the computer system 702. Examples of the operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 734 may facilitate display, execution, interaction, manipulation, or operation of program components through textual or graphical facilities. For example, the user interface 734 may provide computer interaction interface elements on a display system operatively connected to the computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 702 may implement a web browser 736 stored program component. The web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. The web browsers 736 may utilize facilities such as AJAX, DHTML, ADOBE® FLASH® platform, JAVASCRIPT® programming language, JAVA® programming language, application programming interfaces (APis), etc. In some embodiments, the computer system 702 may implement a mail server 738 stored program component. The mail server 738 may be an Internet mail server such as MICROSOFT® EXCHANGE® mail server, or the like. The mail server 738 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. The mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 702 may implement a mail client 740 stored program component. The mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above are not routine, or conventional, or well understood in the art. The techniques discussed above provide for multi-modality classification using augmented data. The techniques may improve the accuracy of the neural network for classifying the input image using the plurality of augmented data. Moreover, the techniques may ensures consistency in the explanation from the different modalities of explanation and classify the input image to reduce the errors creeping in to the system.

Various embodiments provides method and system for multi-modality classification using augmented data. The provided method of multi-modality classification may be configured to utilize additional information for multi-modality which may be classify the input image precisely even when inadequate data may be available in the training data. Hence, the method provides an enhanced and improved classification mechanism for the multi-modalities. Additionally, the multi-modal classification may facilitate blending of disjoint content of a video with an audio or text of the object being taken at some other time slot to make use of the contents as additional information. Hence, the provided method may enhance the precision of classification.

The specification has described method and system for multi-modality classification using augmented data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for multi-modality classification using augmented data, the system comprising:
    a processor; and
    a memory communicatively coupled to the processor, wherein the memory stores processor instructions, which, on execution, causes the processor to:
        generate a pattern for each of a plurality of augmented data associated with each of a plurality of object classes, based on at least one modality associated with each of the plurality of objects classes using a Long Term Short Memory (LSTM) classifier and a Layer-wise Relevance Propagation (LRP), wherein the plurality of augmented data for each of the plurality of object classes comprises at least one feature;
        classify an input image into a first object class of the plurality of object classes based on one or more objects within the input image using a Convolution Neural Network (CNN); and
        re-classify the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold.

2. The system of claim 1, wherein the at least one modality comprises at least one of image, touch, smell, taste, audio, or video.

3. The system of claim 1, further comprising:
receiving a training data, by the CNN, from at least one of a plurality of sources, wherein the training data comprises at least one of image, video, sound, touch, or small;
identifying one or more objects associated with each of the plurality of object classes using the training data; and
training the CNN based on the identified one or more objects associated.

4. The system of claim 1, further comprising:
generating a metadata using the LSTM classifier for each of the plurality of object classes, wherein the metadata is a textual string comprising one or more objects and corresponding relation with each of the plurality of object classes; and
parsing the metadata through a parser to identify parts of speech from the metadata to identify the relation of each of the one or more objects with each of the plurality of object classes.

5. The system of claim 1, further comprising maintaining the plurality of augmented data and corresponding features for each of the plurality of object classes in a class table.

6. The system of claim 5, wherein the re-classifying comprises:
matching the patterns associated with the input image with the patterns generated for each of the plurality of augmented data;
determining a relevancy in descending order for each of the plurality of augmented data based on the matching; and
identifying an object class for the input image based on the determined relevancy for each of the plurality of augmented data.

7. The system of claim 1, further comprising:
generating a query to the user by the LSTM classifier, when the accuracy of classification by the CNN into one of the first object class and the second object class is below the matching threshold; and
receiving one or more additional augmented data from the user for classification of the input image into an object class of the plurality of object classes.

8. The system of claim 7, further comprising storing each of the one or more additional augmented data for future analysis.

9. The system of claim 1, further comprising rendering one of the first object class and the second object class into which the input image is re-classified to a user along with the metadata associated with the input image.

10. A method of multi-modality classification using augmented data, the method comprising:
generating, by a classification device, a pattern for each of a plurality of augmented data associated with each of a plurality of object classes, based on at least one modality associated with each of the plurality of objects classes using a Long Term Short Memory (LSTM) classifier and a Layer-wise Relevance Propagation (LRP), wherein the plurality of augmented data for each of the plurality of object classes comprises at least one feature;
classifying, by the classifying device, an input image into a first object class of the plurality of object classes based on one or more objects within the input image using a Convolution Neural Network (CNN); and
re-classifying, by the classifying device, the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold.

11. The method of claim 10, wherein the at least one modality comprises at least one of image, touch, smell, taste, audio, or video.

12. The method of claim 10, further comprising:
receiving a training data, by the CNN, from at least one of a plurality of sources, wherein the training data comprises at least one of image, video, sound, touch, or small;
identifying one or more objects associated with each of the plurality of object classes using the training data; and
training the CNN based on the identified one or more objects associated.

13. The method of claim 10, further comprising:
generating a metadata using the LSTM classifier for each of the plurality of object classes, wherein the metadata is a textual string comprising one or more objects and corresponding relation with each of the plurality of object classes; and
parsing the metadata through a parser to identify parts of speech from the metadata to identify the relation of each of the one or more objects with each of the plurality of object classes.

14. The method of claim 10, further comprising maintaining the plurality of augmented data and corresponding features for each of the plurality of object classes in a class table.

15. The method of claim 14, wherein the re-classifying comprises:
matching the patterns associated with the input image with the patterns generated for each of the plurality of augmented data;
determining a relevancy in descending order for each of the plurality of augmented data based on the matching; and
identifying an object class for the input image based on the determined relevancy for each of the plurality of augmented data.

16. The method of claim 10, further comprising:
generating a query to the user by the LSTM classifier, when the accuracy of classification by the CNN into one of the first object class and the second object class is below the matching threshold; and
receiving one or more additional augmented data from the user for classification of the input image into an object class of the plurality of object classes.

17. The method of claim 16, further comprising storing each of the one or more additional augmented data for future analysis.

18. The method of claim 10, further comprising rendering one of the first object class and the second object class into which the input image is re-classified to a user along with the metadata associated with the input image.

19. A non-transitory computer-readable storage medium having stored thereon, a set of computer-executable instructions causing a computer comprising one or more processors to perform steps comprising:
generating a pattern for each of a plurality of augmented data associated with each of a plurality of object classes, based on at least one modality associated with each of the plurality of objects classes using a Long Term Short Memory (LSTM) classifier and a Layer-wise Relevance Propagation (LRP), wherein the plurality of augmented data for each of the plurality of object classes comprises at least one feature;

classifying an input image into a first object class of the plurality of object classes based on one or more objects within the input image using a Convolution Neural Network (CNN); and re-classifying the input image into one of the first object class or a second object class of the plurality of object classes based on matching of patterns associated with the input image with the pattern associated with each of the at least one augmented data using the LSTM classifier, when the accuracy of classification by the CNN into the first object class is below a matching threshold.

* * * * *